(12) United States Patent
McKenzie

(10) Patent No.: US 10,145,200 B2
(45) Date of Patent: Dec. 4, 2018

(54) METHOD AND SYSTEM FOR CONTROLLING SLIP JOINT PACKER ACTIVATION

(71) Applicant: Romar International Limited, Aberdeenshire (GB)

(72) Inventor: Martin McKenzie, Aberdeenshire (GB)

(73) Assignee: Romar International Limited, Aberdeenshire (GB)

( * ) Notice: Subject to any disclaimer, the term of this patent is extended or adjusted under 35 U.S.C. 154(b) by 0 days.

(21) Appl. No.: 15/129,111

(22) PCT Filed: Mar. 31, 2015

(86) PCT No.: PCT/GB2015/051007
§ 371 (c)(1),
(2) Date: Sep. 26, 2016

(87) PCT Pub. No.: WO2015/150800
PCT Pub. Date: Oct. 8, 2015

(65) Prior Publication Data
US 2017/0107782 A1    Apr. 20, 2017

(30) Foreign Application Priority Data
Mar. 31, 2014    (GB) .................................. 1405812.7

(51) Int. Cl.
*E21B 17/01* (2006.01)
*E21B 17/07* (2006.01)
(Continued)

(52) U.S. Cl.
CPC ............ *E21B 33/127* (2013.01); *E21B 17/01* (2013.01); *E21B 17/07* (2013.01); *E21B 34/066* (2013.01); *E21B 47/06* (2013.01)

(58) Field of Classification Search
CPC ........ E21B 17/01; E21B 17/07; E21B 19/004; E21B 19/006; E21B 19/09; E21B 33/127; E21B 34/066; E21B 47/06
See application file for complete search history.

(56) References Cited

U.S. PATENT DOCUMENTS 5,291,947 A * 3/1994 Stracke ............... E21B 33/1243
166/187
5,727,630 A * 3/1998 Brammer .............. E21B 19/006
166/355
(Continued)

FOREIGN PATENT DOCUMENTS

WO    WO2009086323    7/2009

OTHER PUBLICATIONS

International Search Report and Written Opinion for application No. PCT/GB2015/051007 dated Oct. 14, 2015.

*Primary Examiner* — Matthew R Buck
(74) *Attorney, Agent, or Firm* — Workman Nydegger

(57) ABSTRACT

The invention provides a system and method for controlling packer activation in a riser slip joint. The system comprises a first electronically actuated valve disposed between a first packer and a fluid pressure source for the actuation of the first packer. A second electronically actuated valve is disposed between a second packer and a fluid pressure source for the actuation of the second packer. A control unit is operable to actuate the first and/or second electronically actuated valve in response to at least one input signal to control the activation of the first and second packers, and is configured to control the actuation of the first and second electronically actuated valves independently.

24 Claims, 5 Drawing Sheets

(51) Int. Cl.
*E21B 33/127* (2006.01)
*E21B 34/06* (2006.01)
*E21B 47/06* (2012.01)

(56) References Cited

U.S. PATENT DOCUMENTS

| | | | |
|---|---|---|---|
| 7,093,674 B2* | 8/2006 | Paluch | E21B 7/068 |
| | | | 166/250.17 |
| 8,720,583 B2* | 5/2014 | Rodger | E21B 17/01 |
| | | | 166/179 |
| 9,243,490 B2* | 1/2016 | Ade-Fosudo | E21B 33/1275 |
| 2004/0040707 A1 | 3/2004 | Dusterhoft | |
| 2004/0112597 A1* | 6/2004 | Hamid | E21B 33/1208 |
| | | | 166/250.17 |
| 2013/0175094 A1* | 7/2013 | Ross | E21B 23/00 |
| | | | 175/57 |

* cited by examiner

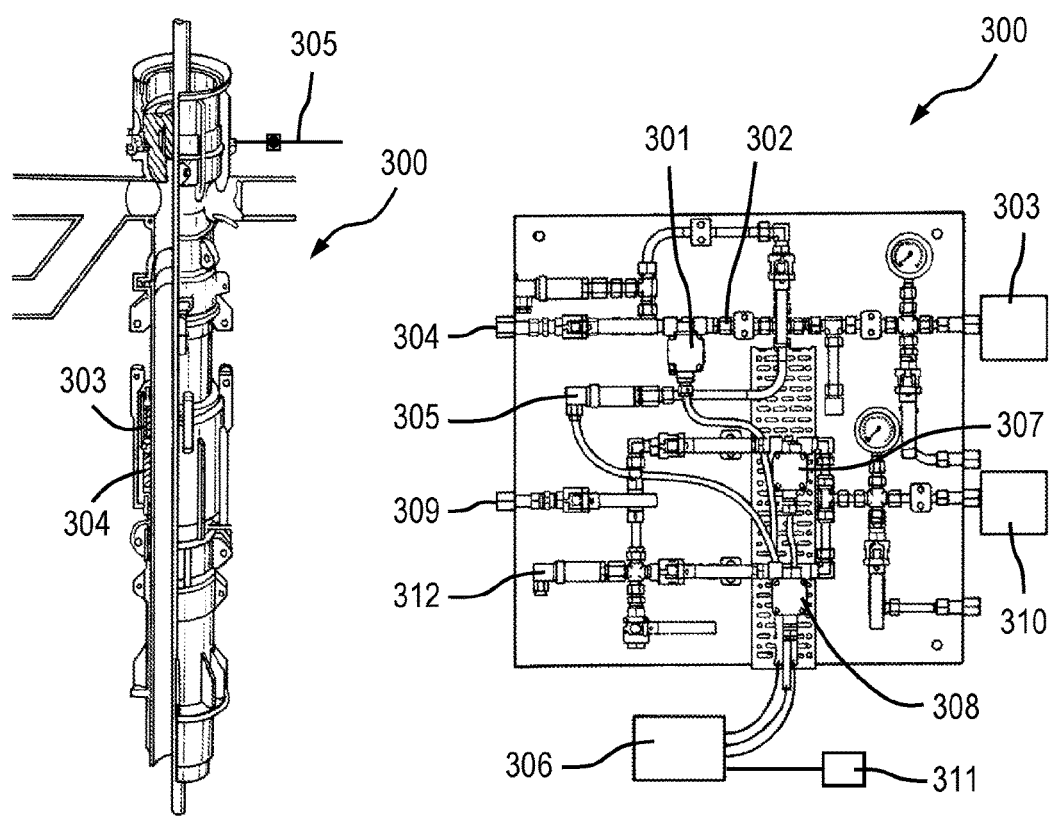
Fig. 3A  Fig. 3B

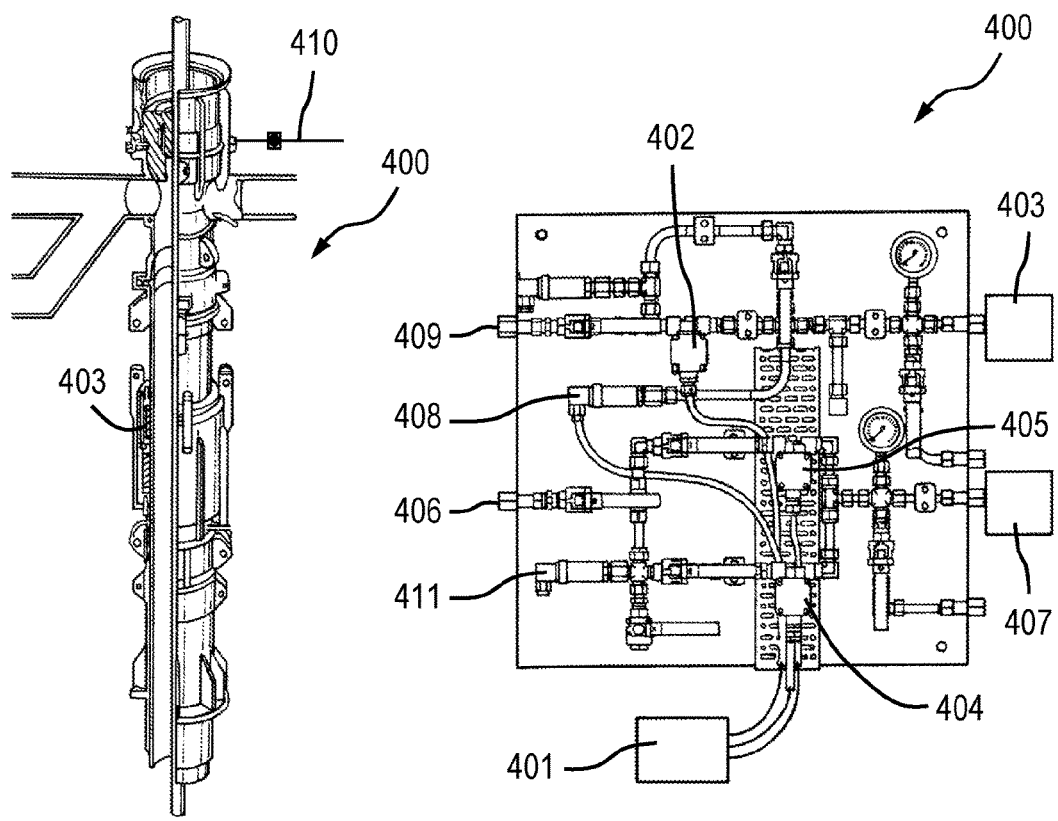
*Fig. 4A*          *Fig. 4B*

METHOD AND SYSTEM FOR CONTROLLING SLIP JOINT PACKER ACTIVATION

CROSS-REFERENCE TO RELATED APPLICATIONS

The present invention is a 35 U.S.C. § 371 U.S. National Stage of International Application No. PCT/GB2015/051007, filed on Mar. 31, 2015, which claims priority to Great Britain Patent Application No. 1405812.7, filed Mar. 31, 2014, the entire content of each of which is incorporated herein by reference.

The present invention relates to the field of slip joint packer systems, in particular to a method and system for controlling slip joint packer activation.

BACKGROUND TO THE INVENTION

During subsea drilling operations it is necessary to remove drilling cuttings from the subsea wellbore to the surface. A marine riser provides a conduit that extends the subsea wellbore to a surface drilling facility.

To preserve the structural integrity of the riser and its connection to the wellbore it is necessary to restrict the riser's exposure to movement due to ocean heave. Slip joints are expansion and contraction tools that accept the movement associated with ocean heave and temperature or pressure changes without allowing the movement to affect the riser pipe on the seafloor. One end of the slip joint is attached to the surface drilling facility and permits ocean heave (vertical motion) while the other end of the slip joint is connected to the riser. As the drilling facility heaves, the slip joint telescopes in or out by the same amount so that the riser below the slip joint is relatively unaffected by ocean heave.

During offshore drilling, fluids are used to aid the drilling operation and oil contaminated mud is produced. The main functions of drilling fluids and contaminated mud include providing hydrostatic pressure to prevent formation fluids from entering the wellbore, keeping the drill bit cool and clean during drilling, and providing an upward pressure to remove the drill cuttings from the wellbore through the connected riser and slip joint conduit to the surface drilling facility.

However, the drill fluids and contaminated mud can be harmful if released into the environment and marine ecosystems. Prevention of leakage of drilling fluids and contaminated mud at the connection between the riser and slip joint is a major concern for the oil industry.

Oil rig owners, drilling contractors and offshore operators want to avoid spillage to prevent loss of hydrostatic pressure in the wellbore and avoid unnecessary costs. Prevention of leakages is also important due to the potential negative impact on the company from an attentive global community focussed on environmental protection.

Currently, the means of containment of the drilling fluids and contaminated mud between the riser and the slip joint is by using packer devices which form part of the slip joint apparatus. Packer devices employ flexible elements which expand externally to seal any gaps between the riser and the slip joint. Typically they operate by pumping a fluid into the flexible element to inflate the packer. Once inflated the packer seals the connection between the riser and slip joint and contains the fluids and mud.

In order to provide complete containment of drilling fluids and contaminated mud when using inflatable packers, it has become common practice to apply high inflating pressure to the sealing packer. However such a high pressure may lead to premature wear of the sealing packer and may result in failure of the packer and leakage of the drilling fluid and mud. Therefore the leakage of drilling fluid will occur when a packer fails or the pressure system fails and is not able to energise the packer.

Currently, riser slip joint systems have a primary upper packer which is energised to seal the overlap connection between the riser and the slip joint and secondary lower packer which is energised in the event of a failure of the primary upper packer to maintain the seal.

WO 2009/086323 discloses a pressure circuit for a riser slip joint system that recognises failure of the upper packer due to hose failure, leakage of drilling fluids or rig air pressure loss. The pressure circuit uses a differential pressure valve which receives the pressure from two points in the circuit, a first measurement point which is closer to the pressure source than the second measurement point. If the pressure at the second point is an operational amount lower than the first point the differential pressure valve switches to de-energise the upper packer and energise a lower packer.

A disadvantage of the system of WO 2009/086323 is that the differential pressure valve is a mechanical switch which may be slow to react. Any delay in response to the upper packer failure means the slip joint may not be sealed and the fluids may leak into the environment. Another disadvantage is that contaminants frequently build up in packer energising systems. The differential pressure valve may become blocked or restricted which could impede or prevent the differential pressure valve from switching between the upper and lower packer. This can lead to critical failure of the containment system. If the upper packer fails and the differential pressure valve is completely blocked with contaminants such that the valve is unable to switch to the lower packer pathway, the lower packer may not be energised and the drilling fluids may not be contained. If the upper packer fails and the differential pressure valve is partially blocked with contaminants and unable to completely switch to the lower packer pathway, the lower packer may not be fully energised, the seal may be inadequate and the drilling fluids may not be fully contained.

Systems that use pressure transducers to monitor the fluid pressure supplied to a primary upper packer have also been proposed. Such systems use a combination of a pressure transducer and solenoid valves. If a pressure decrease is detected in a fluid supplied to a primary upper packer, the supply to the primary upper packer is closed and a secondary lower packer is activated. However, these systems have limited functionality as they are restricted to switching between the activation of the upper packer or the lower packer.

It is the object of the present invention to obviate or at least mitigate the foregoing disadvantages of packer management systems.

It is another object of an aspect of the present invention to provide a packer activation system that is capable of facilitating control of packer activation and ensuring that the seal integrity between the riser and the slip joint is maintained.

It is a further object of an aspect of the present invention to provide a packer activation system which reliably activates the packers. Further aims of the invention will become apparent from the following description.

SUMMARY OF THE INVENTION

According to a first aspect of the invention, there is provided a system for controlling packer activation in a riser slip joint comprising:

a first electronically actuated valve disposed between a first packer and a fluid pressure source for the actuation of the first packer;
a second electronically actuated valve disposed between a second packer and a fluid pressure source for the actuation of the second packer;
a control unit operable to actuate the first and/or second electronically actuated valve in response to at least one input signal to control the activation of the first and second packers;
and wherein the control unit is configured to control the actuation of the first and second electronically actuated valves independently.

By providing a control unit which controls the actuation of each electronically actuated valve independently, either packer can be energised irrespective of the status of the other packer.

By providing independent control of the actuation of each electronically actuated valve the activation of each packer is not dependent on the activation status or condition (damaged or functional) of the other packer. This may facilitate improved functionality of the packer activation system by providing a number of different packer activation configurations.

The control unit can therefore energise the first packer only, the second packer only or both packers at the same time. The independent control of the actuation of each electronically actuated valve may allow a damaged or failing first packer to be de-energised to conserve pressurised supply air whilst maintaining the status or energising the second packer. The independent control of the actuation of each electronically actuated valve may allow a damaged or failing first packer to remain energised while energising the second packer to ensure the seal is maintained.

The system may facilitate the improved control of packer activation. By providing a control unit which controls the energising of each of the packers individually or at the same time, a reliable seal can be maintained between the riser and the slip joint.

By energising the first and second packer at the same time the method may facilitate the diagnosis of a fault to one packer while the other packer maintains the seal between the riser and the slip joint. The method may facilitate locating the fault in the pathway quickly and efficiently by maintaining the fluid pressure to the pathway of the failed or damaged packer pressure.

Preferably the first packer may be an upper packer and the second packer may be a lower packer. Alternatively the first packer may be a lower packer and the second packer may be an upper packer.

The input signal may be generated by a manual control system. The input signal may be generated by a user manually operating packer activation controls to energise the second packer only, the first only or both packers at the same time. Alternatively, the input signal may be generated by at least one sensor.

The input signal may be generated by at least one sensor connected to the control unit. The at least one sensor may be a pressure sensor, volume sensor, density sensor or flow rate sensor. Preferably the at least one sensor may be a pressure sensor. More preferably the pressure sensor may be a pressure transducer.

Preferably the user may manually operate the packer activation controls remotely.

In a preferred embodiment the electronically actuated valve may be a solenoid valve.

The system may comprise a pressure transducer which measures the pressure in the pathway between the fluid pressure source and the packer to detect a packer failure. The pressure transducer may be disposed between the fluid pressure source and the packer. A control unit may receive pressure data from the pressure transducer and compare the measured pressure level with at least one historical measured pressure level for pathway between the fluid pressure source and the packer.

The control unit may determine when the measured pressure differs from at least one historical measured pressure level. The control unit may generate a control signal when the change in pressure is equal to or greater than a preset value.

The preset value may be a fixed amount. The control unit may be programmable with the preset value. The preset value may be set as a function of the historical measured pressure level. The preset value may be a percentage of the historical measured pressure levels.

During normal operations of a functional packer the historical measured fluid pressure level in the pathway between the fluid pressure source and the packer may be 620 kPa. The preset value may be set in the control unit at 80 kPa. If the packer fails the pressure in the pathway between the fluid pressure source and the packer may drop. If the pressure level in the pathway is measured at 520 kPa, the control unit determines that the pressure signal differs from at least one historical measured pressure level by 100 kPa. The control unit determines that the change in pressure from the pressure drop is greater than the preset value of 80 kPa and a control signal may be generated from the control unit.

As the packer ages and/or its condition wears during use, minor leaks in the packer may occur. These minor leaks which may not affect the structural integrity of the packer may require an increased fluid pressure level to be supplied to the packer to maintain the packer in a fully energised state. Since the change in pressure is a measure of the pressure level in the pathway in reference to at least one historical measured pressure level it is not necessary to specify a reference minimum pressure threshold level required to generate a control signal from the control unit. The preset value that the measured pressure in the pathway needs to drop in relation to historical pressure levels to activate the control signal may remain the same irrespective of the condition or age of the packer.

A new packer may require a pressure of 620 kPa to fully energise the packer. As the packer ages and/or its condition wears, the pressure may be increased to 780 kPa to maintain the packer in a fully energised state. However, the preset value remains at the same level throughout the life of the packer for example at 80 kPa. Therefore a measured pressure of 700 kPa or less in the pathway would generate a control signal from the control unit.

Alternatively, the control unit may generate a control signal when the pressure in the pathway between the fluid pressure source and the packer drops to or below a reference level.

In one embodiment the reference level is a preset minimum pressure threshold and the control unit may generate a control signal when the measured pressure level in the pathway between the fluid pressure source and the packer is equal to or lower than a preset minimum pressure threshold set in the control unit.

In another embodiment the control unit may generate a control signal when the measured pressure level in the pathway between the fluid pressure source and the packer is outside a pressure threshold range.

The system may comprise a control unit having a preset minimum pressure threshold or pressure threshold range based on the condition and/or the age of the packer. The preset minimum pressure threshold or desired pressure threshold range may be adjusted to compensate for the increased pressure required to maintain the packer in a fully energised state.

Alternatively the system may comprise a control unit having a preset minimum pressure threshold setting or desired pressure threshold range based on the recommended minimum pressure guidelines for energising the packer.

Preferably, the control signal may actuate a solenoid valve disposed between the first packer and the fluid pressure source. The solenoid valve may close the pathway between the pressurised fluid pressure source and the first packer, thereby de-energising the first packer.

The control unit may activate an alarm when the pressure detected by pressure transducer is lower than historical measured pressure levels. The alarm may alert a user that the pressure in the pathway between the fluid pressure source and the first packer has dropped and the first packer may not be receiving sufficient pressure to maintain an adequate seal.

The control unit may provide a display screen and a message may be displayed to inform the user of the status of the system, such as 'Packer Pressure Failure'.

Preferably, the control signal may actuate at least one further solenoid valve disposed in the pathway between a fluid pressure source and the second packer. The actuation of at least one further solenoid valve may open the pathway between the pressurised fluid pressure source and the second packer, thereby energising the second packer. The system may comprise at least one flow control valve disposed in the pathway between a fluid pressure source and the first packer. The flow control valve may facilitate the amplification of any pressure difference along the pathway between a fluid pressure source and the first packer by restricting the air flow to the first packer.

The system may comprise a pressure transducer which may measure the pressure of a fluid in a rig divert control pathway. Rig divert systems are used in drilling rigs to protect against high pressure blowouts during drilling operations. In a rig divert operation, the packer seal between the riser and slip joint must be maintained so that the diverter can safely divert the high pressure fluid to an auxiliary pathway thereby preventing the high pressure fluid from reaching the surface drill facility.

The pressure transducer may be disposed in any rig divert control system which may experience a change in pressure upon activation of the rig divert operation. The rig divert control system may be a hydraulic or pneumatic control system. Multiple pressure transducers may be located throughout the rig divert control system. A control unit may receive pressure data from a pressure transducer and may compare the measured pressure level with a preset desired pressure threshold range.

Preferably, the control unit generates a control signal when the measured pressure level of the fluid in the rig divert control line is outside a desired pressure threshold range set in the control unit. Preferably, if the first packer is in a de-energised state, the control signal actuates a solenoid valve disposed in the pathway between a fluid pressure source and the first packer. The solenoid valve may open the pathway between the fluid pressure source and the first packer, thereby energising the first packer.

More preferably, if the second packer is in a de-energised state, the control signal actuates at least one further solenoid valve disposed in the pathway between a fluid pressure source and the second packer. The actuation of at least one further solenoid valve opens the pathway between the pressurised fluid supply and the second packer, thereby energising the second packer.

The control unit may provide a display screen and a message may be displayed to inform the user of the status of the system, such as 'Divert Activated'.

The system may provide that in a rig divert operation both packers are energised at the same time.

The fluid pressure source for the first and second packer may be the same fluid pressure source. Preferably the fluid pressure source may be a separate fluid pressure source for the first and second packer. A first fluid pressure source connected to the first packer and a second fluid pressure source connected to the second packer. Preferably the fluid pressure source is a pressurised gas supply such as air. More preferably the fluid pressure source is a pressurised hydraulic liquid supply.

The system may comprise a pressure transducer which may measure the pressure of the fluid pressure source connected to the first packer to detect a fluid pressure source failure. The pressure transducer may be disposed in the pathway between the fluid supply and the first packer.

The pressure transducer may be disposed in the pathway between the fluid pressure source and a solenoid valve located in the pathway.

When the electronically actuated valve is closed, the pressure measured by the pressure transducer disposed between the fluid pressure source and the valve may be used to diagnose whether a pressure drop was a result of a fault with the fluid pressure source or a fault with the packer. When the valve is closed and the pressure measured by the pressure transducer rises, the fault may be diagnosed as a failed upper packer. However, if when the valve is closed and the pressure level measured by the pressure transducer remains the same or drops further, the fault may be diagnosed as a fluid pressure source failure.

A control unit receives pressure data from the pressure transducer and compares the measured pressure level with historical measured pressure levels. The control unit may generate a control signal when the measured pressure level drops lower than at least one historical measured pressure levels.

The control unit may determine a change in pressure between the measured pressure level and at least one historical measured pressure level. The control unit may generate a control signal when the measured pressure signal differs from at least one historical measured pressure level by an amount equal to or greater than a preset value.

The control unit may be programmable with the preset value. The preset value may be set as a function of at least one historical measured pressure level. The preset value may be a percentage of an historical measured pressure level.

The control unit may generate a control signal when the measured pressure level of the fluid pressure source connected to the pathway is lower than a preset minimum pressure threshold level or outside a desired pressure threshold range set in the control unit.

Preferably, the control signal actuates the solenoid valve disposed between the first packer and the fluid pressure source. The solenoid valve may close the pathway between the fluid pressure source and the first packer, thereby de-energising the first packer.

The control signal may actuate at least one further solenoid valve disposed between the second packer and a second fluid pressure source. The actuation of at least one further solenoid valve may open the pathway between the second fluid pressure source and the second packer, thereby energising the second packer. This has the benefit that the seal is maintained when the first fluid pressure source connected to the first packer fails. The system facilitates the energising of the second packer using a second fluid pressure source.

The control unit may provide a display screen and a message may be displayed to inform the user of the status of the system, such as 'Supply Pressure Failure'.

Further valves may be disposed in the pathways between the packers and their fluid pressure source to facilitate the removal of contaminants from the system that can build up and result in restricted fluid flow and damage to the sensors and valves. Preferably, a drain valve is disposed in the pathway between the second packer and the fluid pressure source of the second packer.

The system may comprise more than one pathway between a first packer and a fluid pressure source. The system may also provide more than one pathway between a second packer and a fluid pressure source. Each of the pathways may comprise an electronically actuated valve. The electronically actuated valves in the pathways between a first packer and a fluid pressure source are preferably activated or deactivated at the same time. The electronically actuated valves in the pathways between a second packer and a fluid pressure source are preferably activated or deactivated at the same time. This may facilitate activation of the upper and/or lower packer in the event one electronically actuated valves is blocked or non-operational.

According to a second aspect of the invention, there is provided a method of controlling packer activation in a riser slip joint comprising:
providing a packer activation apparatus comprising a first electronically actuated valve disposed between a first packer and a fluid pressure source for the actuation of the first packer and a second electronically actuated valve disposed between a second packer and a fluid pressure source for the actuation of the second packer;
receiving at least one input signal in a control unit;
generating a control signal from the control unit in response to the at least one input signal to control the actuation of each electronically actuated valve independently, to thereby independently control the activation of the first and second packers.

The above-described method may facilitate control of the activation of the packers independently of one another using the control unit. This level of control may allow the user to switch between the first and second packer to allow routine maintenance to a packer or replacement of a packer. The method may also facilitate the activating of both packers at the same time during operations where the packer seal may be exposed to high pressures.

Preferably the first packer is an upper packer and the second packer is a lower packer. Alternatively the first packer may be a lower packer and the second packer may be an upper packer.

The method may comprise generating the input signal manually by a user. The method may comprise operating packer activation controls manually to energise the second packer only, the first packer only or both packers at the same time.

Preferably the method may comprise operating the packer activation controls remotely.

Preferably, the method may comprise generating the input signal using at least one pressure sensor.

Preferably the electronically actuated valve is a solenoid valve.

The method may comprise receiving at least one input signal in a control unit by at least one sensor connected to the control unit. Preferably the at least one sensor may measure pressure, volume, density or flow rate. More preferably the at least one sensor may be a pressure transducer.

The method may comprise setting a change in pressure preset value in the control unit.

The method may comprise measuring the pressure in the pathway between a fluid pressure source and the first packer to detect a first packer failure. The method may comprise measuring the pressure in the pathway between a fluid pressure source and the second packer to detect a second packer failure.

The method may comprise tracking and recording historical measured pressure levels of the pressure in the pathway between a fluid pressure source and the first and/or second packer.

Preferably the pressure may be measured using a pressure transducer. The pressure transducer may be disposed between the fluid pressure source and the first packer. The method may comprise receiving pressure data from the pressure transducer and a control unit comparing the measured pressure level with at least one historical measured pressure level received by the pressure transducer.

The method may comprise determining the change in pressure between the measured pressure level received by the pressure transducer and at least one historical measured pressure level received by the pressure transducer. The method may comprise generating a control signal when the measured pressure signal differs from at least one historical measured pressure level by an amount equal to or greater than a preset value.

The method may comprise generating a control signal from the control unit when the pressure transducer measures a pressure level in the pathway between the fluid pressure source and the first packer which is lower than the at least one historical measured pressure level.

Preferably, the method comprises actuating a solenoid valve disposed between the fluid pressure source and the first packer. The method may comprise closing the pathway between the fluid pressure source and the first packer, thereby de-energising the first packer.

Alternatively, the method may comprise setting a minimum pressure threshold or a preset pressure threshold range in the control unit. The method may comprise receiving pressure data from the pressure transducer and a control unit comparing the measured pressure level with the minimum pressure threshold or pressure threshold range in the control unit.

The method may comprise generating a control signal from the control unit when the pressure transducer measures a pressure level in the pathway between the fluid pressure source and the first packer which is either lower than a preset minimum pressure threshold or outside a desired pressure threshold range set in the control unit.

Preferably, the method comprises actuating a solenoid valve disposed between the fluid pressure source and the first packer. The method may comprise closing the pathway between the fluid pressure source and the first packer, thereby de-energising the first packer.

The method may comprise activating an alarm. The alarm may be activated when the measured pressure level differs from at least one historical measured pressure level by an amount equal to or greater than a preset value.

The method may comprise alerting a user that the pressure in the pathway between the fluid pressure source and the first packer has fallen and the first packer may not be receiving sufficient pressure to maintain an adequate seal.

The method may comprise actuating at least one further solenoid valve disposed in the pathway between a fluid pressure source and the second packer. The actuation of at least one further solenoid valve may open the pathway between the fluid pressure source and the second packer, thereby energising the second packer.

The method may comprise measuring the pressure of a fluid in a rig divert control system. Preferably the pressure may be measured using a pressure transducer.

The method may comprise measuring the pressure level in any rig divert control line which may experience a change in pressure upon activation of the rig divert operation. The rig divert control system may be a hydraulic or pneumatic control system. Preferably the pressure may be measured using a pressure transducer.

The method may comprise monitoring multiple pressure transducers disposed throughout the rig divert control system. The method may comprise receiving pressure data from a pressure transducer and comparing the measured pressure level in the control unit with a preset pressure threshold range.

The method may comprise generating a control signal from the control unit when the measured pressure level of the fluid in the rig divert control system is outside the preset pressure threshold range set in the control unit.

The method may comprise activating both packers at the same time during a rig divert operation.

Preferably, if the first packer is in a de-energised state, the method may comprise actuating a solenoid valve disposed in the pathway between a fluid pressure source and the first packer and a fluid supply. The method may comprise opening the pathway between the fluid pressure source and the first packer, thereby energising the first packer.

Preferably, if the second packer is in a de-energised state, the method may comprise actuating at least one further solenoid disposed in the pathway between a fluid pressure source and the second packer. The actuation of at least one further solenoid valve opens the pathway between the pressurised fluid supply and the second packer, thereby energising the second packer.

The fluid pressure source for the first and second packer may be the same fluid pressure source. Preferably the fluid pressure source may be a separate fluid pressure source for the first and second packer. A first fluid pressure source may be connected to the first packer and a second fluid pressure source may be connected to the second packer. Preferably the fluid pressure source is a pressurised air supply. More preferably the fluid pressure source is a pressurised hydraulic supply.

The method may comprise measuring the pressure of the fluid pressure source. The method may comprise providing a pressure transducer at the fluid pressure source. Preferably the method comprises providing a pressure transducer in the pathway between the fluid pressure source and the first packer. More preferably the method may comprise providing the pressure transducer in the pathway between the fluid pressure source and a solenoid valve located in the pathway.

The method may comprise receiving the pressure data from the pressure transducer and comparing the measured pressure level with a historical measured pressure level, a preset pressure threshold level or a desired pressure threshold range set in the control unit. The control unit may generate a control signal when the measured pressure level drops lower than at least one historical measured pressure levels.

The control unit may determine a change in pressure between the measured pressure level and at least one historical measured pressure level. The control unit may generate a control signal when the measured pressure signal differs from at least one historical measured pressure level by an amount equal to or greater than a preset value.

The change in pressure preset value may be a fixed amount. The control unit may be programmable with the preset value. The preset value may be set as a function of at least one historical measured pressure level. The preset value may be a percentage of the historical measured pressure levels.

The method may comprise generating a control signal when the measured pressure level of the fluid pressure source is lower than historical measured pressure levels by a predetermined amount or is lower than a preset minimum pressure threshold level or outside a desired pressure threshold range set in the control unit. Preferably, the method may comprise the control signal actuating the solenoid valve disposed between the first packer and the fluid pressure source. The solenoid valve may close the pathway between the fluid pressure source and the first packer, thereby de-energising the first packer.

The method may comprise actuating at least one further solenoid valve disposed between the second packer and a second fluid pressure source. The actuation of at least one further solenoid valve may open the pathway between the pressurised second fluid pressure source and the second packer, thereby energising the second packer. This has the benefit that the seal may be maintained by activating the second packer when the first fluid pressure source connected to the first packer fails. The system may facilitate the energising of the second packer using a second fluid pressure source.

Embodiments of the second aspect of the invention may include one or more features of the first aspect of the invention or its embodiments, or vice versa.

According to a third aspect of the invention, there is provided a method of controlling packer activation in a riser slip joint comprising:

providing a packer activation apparatus comprising a first electronically actuated valve in a first pathway disposed between a first packer and a fluid pressure source for the actuation of the first packer and at least one further electronically actuated valve in a second pathway disposed between a second packer and a fluid pressure source for the actuation of the second packer;

measuring a pressure level in a rig divert control line;

generating a measurement signal to a control unit;

analysing the measurement signal in the control unit to compare the measured pressure level with a desired range of operating pressure thresholds.

generating a control signal from the control unit when the measured pressure level in the rig divert control line is determined to be outside the desired range of operating pressure thresholds wherein the control signal controls the actuation of each electronically actuated valve independently to control the activation of each packer.

The method according to the third aspect of the invention may facilitate control of the independent activation of the packers using the control unit during a rig divert operation. In a rig divert operation the primary directive is the containment of the drill fluids and mud throughout the high pressure blowout. The method may provide maintenance of the seal integrity by energising both the first and second packers at the same time to ensure that the rig does not lose pollutants the environment. Once the rig divert operation has passed the method may allow a return to normal operations.

The method may comprise measuring the pressure level in a rig divert pathway by providing a pressure transducer in the rig divert pathway.

The method may comprise measuring the pressure level in any rig divert control line in a rig divert control system which may experience a change in pressure upon activation of the rig divert operation. The rig divert control system may be a hydraulic or pneumatic control system. Preferably the pressure may be measured using a pressure sensor. More preferably the pressure sensor is a pressure transducer.

The method may comprise monitoring multiple pressure transducers disposed throughout the rig divert control system. The method may comprise receiving pressure data from a pressure transducer and comparing the measured pressure level in the control unit with a preset pressure threshold range.

The method may comprise generating a control signal from the control unit when the measured pressure level of the fluid in the rig divert control system changes. Preferably the control sign is generated when the pressure level of the fluid in the rig divert control system is outside a preset pressure threshold range set in the control unit.

Preferably the method comprises activating both packers at the same time.

Preferably the electronically actuated valve is a solenoid valve.

Preferably the first packer may be an upper packer and the second packer may be a lower packer. Alternatively the first packer may be a lower packer and the second packer may be an upper packer.

Preferably, if the first packer is in a de-energised state, the method may comprise actuating a solenoid valve disposed in the pathway between a fluid pressure source and the first packer and a fluid supply. The method may comprise opening the pathway between the fluid pressure source and the first packer, thereby energising the first packer.

Preferably if the second packer is in a de-energised state, the method may comprise actuating at least one further solenoid valve disposed in the pathway between a fluid pressure source and the second packer. The actuation of at least one further solenoid valve opens the pathway between the pressurised fluid supply and the second packer, thereby energising the second packer.

The fluid pressure source for the first and second packer may be the same fluid pressure source. Preferably the fluid pressure source may be a separate fluid pressure source for the first and second packer. A first fluid pressure source may be connected to the first packer and a second fluid pressure source may be connected to the second packer.

Preferably the fluid pressure source may be a pressurised air supply. More preferably the fluid pressure source is a pressurised hydraulic supply.

Embodiments of the third aspect of the invention may include one or more features of the first aspect or second aspects of the invention or their embodiments, or vice versa.

According to a fourth aspect of the invention, there is provided a method of controlling packer activation in a riser slip joint comprising:
providing a packer activation apparatus comprising a first electronically actuated valve in a first pathway disposed between a first packer and a fluid pressure source for the actuation of the first packer and at least one further electronically actuated valve in a second pathway disposed between a second packer and a fluid pressure source for the actuation of the second packer;
measuring the pressure level in the first and/or second pathway;
generating a measurement signal to a control unit;
analysing the measurement signal in the control unit to compare the measured pressure level with a desired operating pressure threshold range;
generating a control signal from the control unit when the measured pressure level in the first and/or second pathway is determined to be lower than at least one historical measured pressure levels for the first and/or second pathway wherein the control signal controls the actuation of each electronically actuated valve to thereby independently control the activation of the first and/or second packers.

The method according to the fourth aspect of the invention may facilitate independent activation control of each packer in the event of failure of one packer. The method may comprise activating the intact packer to maintain the seal and provides the user with the option of maintaining the activation of the failing packer or de-activating it.

The user may prefer to maintain the activation of both packers even though one is damaged and may result in reduced functionality. One such circumstance is during a rig divert operation where it is essential to maintain seal integrity. The method may facilitate the user adjusting the pressure supplied to the intact packer to ensure the integrity of seal is maintained. Alternatively, the user may prefer to deactivate the damaged packer so that repair can be made or the damaged packer may be replaced.

If the pressure of the blowout during a rig divert operation is low or reduces over time, the method may comprise adjusting the pressure supplied to one or both packers, or de-energising one of the packers completely.

Preferably the electronically actuated valve is a solenoid valve.

The method may comprise setting a preset value in the control unit.

The method may comprise measuring the pressure in the pathway between a fluid pressure source and the first packer to detect a first packer failure.

The method may comprise measuring the pressure in the pathway between a fluid pressure source and the second packer to detect a second packer failure.

The method may comprise tracking and recording historical measured pressure levels of the pressure in the pathway between a fluid pressure source and the first and/or second packer.

Preferably the pressure may be measured using a pressure transducer. The pressure transducer may be disposed between the fluid pressure source and the first packer. The method may comprise receiving pressure data from the pressure transducer and a control unit comparing the measured pressure level with at least one historical measured pressure level.

The method may comprise determining the change in pressure between the measured pressure level and at least one historical measured pressure level. The method may comprise generating a control signal when the measured pressure signal differs from at least one historical measured pressure level by an amount equal to or greater than a preset value.

The method may comprise activating the second packer when the change in pressure between the measured pressure level and the historical measured pressure levels of the first pathway disposed between the first packer and a fluid pressure source is greater than the preset value.

The method may comprise activating the first packer when the change on pressure between the measured pressure level and the historical measured pressure levels of the second pathway disposed between the first packer and a fluid pressure source is greater than the preset value.

The method may comprise activating the first and second packers when the change in pressure between the measure pressure levels and the historical measured pressure levels of the first and/or second pathway is greater than the preset value(s).

Preferably the first packer may be an upper packer and the second packer may be a second packer. Alternatively the first packer may be a second packer and the second packer may be an upper packer.

The method may comprise measuring the pressure in the pathway between a fluid pressure source and the first packer to detect a first packer failure. Preferably the pressure may be measured using a pressure transducer. Preferably the method may comprise providing a pressure transducer in a pathway between a fluid pressure source and the first packer. The method may comprise receiving pressure data from the pressure transducer and a control unit comparing the measured pressure level with at least one historical measured pressure level.

The method may comprise calculating the pressure difference between the measured pressure signal and at least one historical measured pressure level. The method may comprise generating a control signal when the change in pressure is equal to or greater than a preset value.

Preferably, the method comprises actuating a solenoid disposed between the fluid pressure source and the first packer. The method may comprise closing the pathway between a fluid pressure source and the first packer, thereby de-energising the first packer. The method may comprise opening the pathway between a fluid pressure source and the second packer, thereby energising the second packer.

The method may comprise measuring the pressure in the pathway between a fluid pressure source and the second packer to detect a second packer failure. Preferably the pressure may be measured using a pressure transducer. Preferably the method may comprise providing a pressure transducer in a pathway between the fluid pressure source and the second packer. The method may comprise receiving pressure data from the pressure transducer and a control unit comparing the measured pressure level with at least one historical measured pressure level.

The method may comprise generating a control signal from the control unit when the pressure transducer measures a pressure level in the pathway between the fluid pressure source and the second packer which is lower than the at least one historical measured pressure level by a predetermined pressure amount.

Preferably, the method comprises actuating a solenoid disposed between the fluid pressure source and the second packer. The method may comprise closing the pathway between the fluid pressure source and the second packer, thereby de-energising the second packer. The method may comprise opening the pathway between a fluid pressure source and the first packer, thereby energising the first packer.

Embodiments of the fourth aspect of the invention may include one or more features of any of the first, second or third aspects of the invention or their embodiments, or vice versa.

According to a fifth aspect of the invention, there is provided a method of controlling packer activation in a riser slip joint comprising:
providing a packer activation apparatus comprising a first electronically actuated valve in a first pathway disposed between a first packer and a fluid pressure source for the actuation of the first packer and at least one further electronically actuated valve in a second pathway disposed between a second packer and a fluid pressure source for the actuation of the second packer;
measuring the pressure level in a fluid pressure source;
generating a measurement signal to a control unit analysing the measurement signal in the control unit to compare the measured pressure level with a desired operating pressure threshold range;
generating a control signal from the control unit when the measured pressure level in the fluid pressure source is determined to be outside the desired range of operating pressure thresholds wherein the control signal controls the actuation of each electronically actuated valve independently to control the activation of each packer.

The method of the fifth aspect of the invention may provide an assessment of the pressure in a fluid pressure source in a packer activation system. As stated previously, it is essential that the seal between the riser and the slip joint is maintained to prevent leaking of well fluids to the environment. The method may facilitate the monitoring of a fluid pressure source and facilitate the activation of the first, second or both packers accordingly.

The method may comprise providing the same fluid pressure source for the first and second packer. Preferably the method may comprise providing a separate fluid pressure source for the first and second packer. A first fluid pressure source connected to the first packer and a second fluid pressure source connected to the second packer. The method may comprise providing a pressurised air supply and/or a pressurised hydraulic supply.

The method may comprise activating the second packer when the measured pressure level in the first fluid pressure source is outside a desired operating pressure threshold range.

The method may comprise activating the first packer when the measured pressure level in the second fluid pressure source is outside the desired operating pressure threshold range.

The method may comprise activating the first and second packers when the measured pressure level in the first and/or second fluid pressure source is outside the desired operating pressure threshold range.

Preferably the first packer is an upper packer and the second packer is a second packer.

The method may comprise measuring the pressure of the fluid pressure source to detect a fluid pressure source failure. The method may comprise measuring the pressure level in the pathway between the fluid pressure source and the first packer. More preferably the method may comprise measuring the pressure in the pathway between the fluid pressure source and a solenoid valve located in the pathway.

The method may comprise measuring the pressure of the fluid pressure source to detect a fluid pressure source failure. The method may comprise measuring the pressure level in the pathway between the fluid pressure source and the second packer. More preferably the method may comprise measuring the pressure in the pathway between the fluid pressure source and an electronically actuated valve located in the pathway.

The method may comprise receiving the pressure data from the pressure transducer and comparing the measured pressure level with a desired pressure threshold range.

The method may comprise generating a control signal when the measured pressure level of the fluid pressure source which supplies the first packer is outside a desired pressure threshold range set in the control unit. Preferably, the method may comprise actuating the electronically actuated valve disposed between the first packer and the fluid pressure source. Preferably, the method may comprise closing the pathway between the fluid pressure source and the first packer, thereby de-energising the first packer.

The method may comprise actuating at least one further electronically actuated valve disposed between the second packer and a second fluid pressure source. The actuation of at least one further electronically actuated valve may open the pathway between the pressurised second fluid pressure source and the second packer, thereby energising the second packer. This has the benefit that the seal may be maintained when the first fluid pressure source connected to the first packer fails. The system may facilitate the energising of the second packer using a second fluid pressure source.

The method may comprise generating a control signal when the measured pressure level of the fluid pressure source which supplies to the second packer is outside a desired pressure threshold range set in the control unit. Preferably, the method may comprise actuating the electronically actuated valve disposed between the second packer and the fluid pressure source. The solenoid valve may close the pathway between the fluid pressure source and the second packer, thereby de-energising the second packer.

The method may comprise actuating at least one further electronically actuated valve disposed between the first packer and a first fluid pressure source. The actuation of at least one further solenoid valve may open the pathway between the pressurised first fluid pressure source and the first packer, thereby energising the first packer. This has the benefit that the seal may be maintained when the fluid pressure source connected to the second packer fails. The system may facilitate the energising of the first packer using a second fluid pressure source.

Embodiments of the fifth aspect of the invention may include one or more features of any of the first to fourth aspects of the invention or their embodiments, or vice versa.

According to a sixth aspect of the invention, there is provided a method of controlling packer activation in a riser slip joint comprising:
providing a packer activation apparatus comprising a first electronically actuated valve disposed between a first packer and a fluid pressure source for the actuation of the first packer and at least one further electronically actuated valve in a second pathway disposed between a second packer and a fluid pressure source for the actuation of the second packer;
measuring the pressure level in the first and/or second pathway;
measuring the pressure level in a fluid pressure source;
generating measurement signals to a control unit;
analysing the measurement signals in the control unit to compare the measured pressure levels with at least one historical measured pressure levels;
identifying which measured pressure level is lower than the at least one historical measured pressure levels; and
generating a control signal from the control unit when at least one of the measured pressure levels is determined to be lower than the at least one historical measured pressure level wherein the control unit is operable to control the actuation of each electronically actuated valve to thereby independently control the activation of the first and/or second packers The method of the sixth aspect of the invention may facilitate in the diagnosis of a fault in either the fluid pressure source or a packer, whilst maintaining the seal between the riser and the slip joint.

By providing a method comprising measuring the pressure level in a fluid pressure source and the pressure level in the first and/or second pathway, the user can identify where the fault in the packer system has occurred.

The method may comprise providing the same fluid pressure source for the first and second packer. Preferably the method may comprise providing a separate fluid pressure source for the first and second packer. A first fluid pressure source connected to the first packer and a second fluid pressure source connected to the second packer. The method may comprise providing a pressurised gas supply and/or a pressurised hydraulic supply.

The method may comprise identifying whether the fault occurred due to a packer failure. A pressure drop may be measured in the pathway between a fluid pressure source and the failed packer only. The measured pressure level in the fluid pressure source may remain in the desired operating pressure threshold range.

The method may comprise activating the second packer when the measured pressure level in the first fluid pressure source or the measured pressure level in the first pathway is lower than at least one historical measured pressure level of the first pathway.

The method may comprise determining the change in pressure between the measured pressure level and at least one historical measured pressure level. The method may comprise generating a control signal when the measured pressure signal differs from at least one historical measured pressure level by an amount equal to or greater than a preset value.

The method may comprise activating the second packer when a pressure drop is measured in the first fluid pressure source or in the first pathway.

The method may comprise activating the first packer when a pressure drop is measured in the second fluid pressure source or in the second pathway.

The method may comprise activating the first and second packers when a pressure drop is measured in the first and/or second fluid pressure source or in the first and/or second pathway.

The method may comprise identifying whether the fault occurred due to fluid pressure source failure. A pressure drop may be measured in the fluid pressure source and in the pathway connected to the failed packer as the pressure in the pathway is supplied by the fluid pressure source.

Embodiments of the sixth aspect of the invention may include one or more features of any of the first to fifth aspects of the invention or their embodiments, or vice versa.

According to a seventh aspect of the invention, there is provided a riser or slip joint apparatus comprising a system for controlling packer activation according to the first aspect of the invention.

Embodiments of the seventh aspect of the invention may include one or more features of any of the first to sixth aspects of the invention or their embodiments, or vice versa.

According to a eighth aspect of the invention, there is provided a riser or slip joint system comprising the method for controlling packer activation according to the second aspect of the invention.

Embodiments of the eighth aspect of the invention may include one or more features of any of the first to seventh aspects of the invention or their embodiments, or vice versa.

According to a ninth aspect of the invention, there is provided a hydrocarbon production or exploration installation comprising a system for controlling packer activation according to the first aspect of the invention.

Embodiments of the ninth aspect of the invention may include one or more features of any of the first to eighth aspects of the invention or their embodiments, or vice versa.

According to yet further aspects of the invention, there is provided systems and methods for controlling packer activation and riser, slip joint rigs, hydrocarbon production or exploration installation comprising systems and methods for controlling packer activation as described herein with reference to the appended drawings.

BRIEF DESCRIPTION OF THE DRAWINGS

There will now be described, by way of example only, various embodiments of the invention with reference to the drawings, of which:

FIGS. 3A and B is a schematic instrumentation diagram of a system according to a second embodiment of the invention;

FIGS. 4A and B is a schematic instrumentation diagram of a system according to another embodiment of the invention and;

DETAILED DESCRIPTION OF PREFERRED EMBODIMENTS

Figure 1:
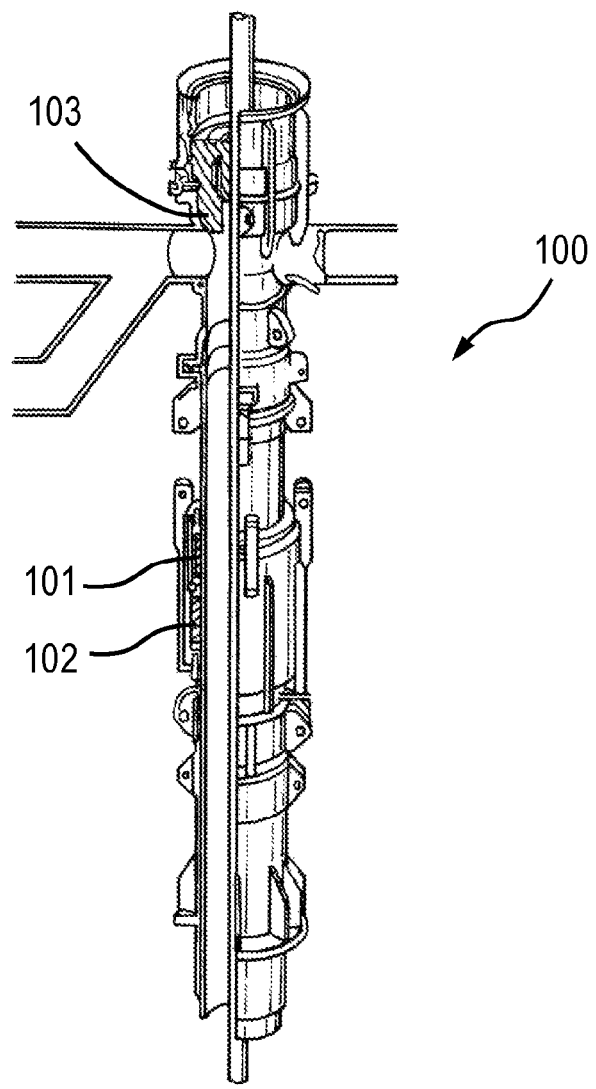
FIG. 1 is a representation of a riser slip joint rig according to the prior art.

FIG. 1 shows features of a riser slip joint rig known in the prior art. The rig 100 comprises a primary upper packer 101 and a secondary lower packer 102. It is current practice in prior art riser slip joint systems to initially have the primary upper packer 101 activated to provide a seal between the slip joint and the riser. The secondary lower packer 102 is only activated to maintain the seal in the event of a failure of the primary upper packer. If the primary upper packer fails, the fluid supply to the primary upper packer is closed to preserve pressurised fluid. The rig 100 also has a diverter element 103 positioned above the upper packer 101 and lower packer 102. The diverter element 103 is activated when a high pressure blowouts occurs during drilling operations. During a rig divert operation the activated packer must maintain the seal between the slip joint and the riser so that the diverter can safely divert the high pressure fluid to an auxiliary pathway.

Figure 2A:
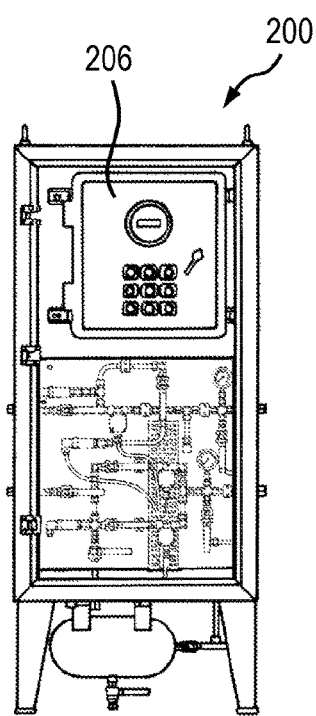
FIGS. 2A and B is a schematic instrumentation diagram of a system according to a first embodiment of the invention.

FIGS. 2A and B schematically show features of the system for controlling packer activation according to a first embodiment of the present invention. The system 200 comprises a fail-safe close first solenoid valve 201 in a first pathway 202 disposed between an upper packer 203 and a pressurised first air supply 204. The air pressure in the first pathway is measured by a first pressure transducer 205 which is disposed in the first pathway. The measured pressure level is communicated to a control unit 206. The control unit 206 is programmable and has adjustable settings.

During normal operations, the control unit maintains the first solenoid valve 201 in an open position. Pressurised air is supplied to the upper packer 203 energising the upper packer 203 and maintains a seal on the slip joint (not shown). The control unit may monitor and record the pressure levels in the pathway 202 between the upper packer 203 and a pressurised first air supply 204.

While the pressurised fluid supply is described as being a pressurised air supply, this is merely an example and any other fluid supply such as a hydraulic supply may be used.

During activation of the functional upper packer 203 the pressure in the pathway 202 between the air supply 204 and the upper packer 203 may be at 620 kPa. This pressure may be monitored and recorded by the control unit 206. A change in pressure preset value of 80 kPa may be set in the control unit 206. In the event of upper packer failure the pressure in the pathway 202 may drop to 500 kPa.

The pressure drop is detected and measured by the pressure transducer 205. The control unit 206 compares the measured pressure level of 500 kPa with the historical pressure level of 620 kPa. The control unit 206 determines that the pressure in the pathway 202 has dropped by 120 kPa. As this change in pressure is greater than the preset value of 80 kPa the control unit generates a control signal which deactivates second and third solenoid valves 207 and 208. The second and third solenoid valves 207 and 208 are 'fail-safe open' solenoid valves. Once deactivated the second and third solenoid valves 207 and 208 open a pathway between a second pressurised air supply 209 and a lower packer 210. The system uses two solenoid valves 207 and 208 in the pathway between a second pressurised air supply 209 and a lower packer 210 so that in the event one solenoid valve is blocked or non-operational the remaining solenoid valve can still function and ensures the lower packer 210 can still be activated.

The pressure level values described here are merely examples and the system may be adapted for a wide range of pressure level values used.

Pressurised air is supplied to the lower packer 210 by the second pressurised air supply 209, energising the lower packer 210 and maintaining a seal on the slip joint (not shown). The control unit 206 may be programmed to maintain the upper packer 203 in an energised state or to de-energise the upper packer 203 in the event of a pressure drop in the air supply 204 to the upper packer 203.

If the user wants to maintain the upper packer 203 in an energised state in the event of a pressure drop in the pathway 202 between the first air supply 204 and the upper packer 203, the control unit 206 can be set to maintain the first solenoid valve 201 in an open state which maintains the pathway 202 in an open state between the first air supply 204 and the upper packer 203.

If the user wants to de-energise the upper packer 203 in the event of a pressure drop in pathway 202 between the first air supply 204 and the upper packer 203 the control unit 206 can be set to deactivate the first solenoid valve 201 which closes the pathway 202 between the first air supply 204 and the upper packer 203.

Optionally, the control unit 206 may activate an alarm 211 when the pressure detected by pressure transducer 205 is lower than the historical measured pressure level by at least a preset value. The alarm 211 alerts a user that the pressure in the first pathway 202 has dropped and the upper packer 203 is not receiving sufficient pressure to maintain an adequate seal.

The above describes the upper packer functioning as the primary packer which is energised during normal operations and the lower packer functioning as a secondary packer which may be activated as an alternative to the primary packer or both packers activated at the same time. However this is merely an example and it will be appreciated that the lower packer may function as the primary packer and the upper packer may function as a secondary packer which may be activated as an alternative to the primary packer or both packers activated at the same time.

Optionally, the system 200 may further comprise a further pressure transducer 212 disposed in the air pressure supply pathway 202 between the first air supply 204 and the first solenoid valve 201. The pressure transducer 212 measures the pressure of the air supply. The measured pressure level is communicated to the control unit 206. The control unit 206 is programmable and has adjustable preset levels for the minimum pressure threshold of the air supply.

In the event that the measured pressure level of the air supply is lower than the preset minimum pressure threshold the control unit 206 may close the first solenoid valve 201 which closes the pathway between the first air supply 204 and the upper packer 203.

The control unit 206 may also deactivate the second and third solenoids valve 207 and 208 opening the pathway between a second pressurised air supply 209 and a lower packer 210, energising the lower packer 210.

Optionally, once the first solenoid valve 201 is closed the pressure level measured by the pressure transducer 212 may be used to diagnose whether the pressure drop was a result of a fault with the first air supply 204 or the upper packer 203. If when the first solenoid valve 201 is closed the pressure level measured by the pressure transducer 212 rises above the preset minimum pressure threshold the fault is diagnosed as a failed upper packer 203. However, if when the first solenoid valve 201 is closed the pressure level measured by the pressure transducer 212 remains below the preset minimum pressure threshold the fault is with the first air supply 204.

By providing a system that allows the activation of packers to be controlled independently it facilitates the user with the option of ensuring the seal is maintained at all costs (both packers energised at the same time) or preserve the pressurised air supply by activating the lower packer only and closing the first pathway to the upper packer where air pressure is being lost due to upper packer failure.

Figure 2B:
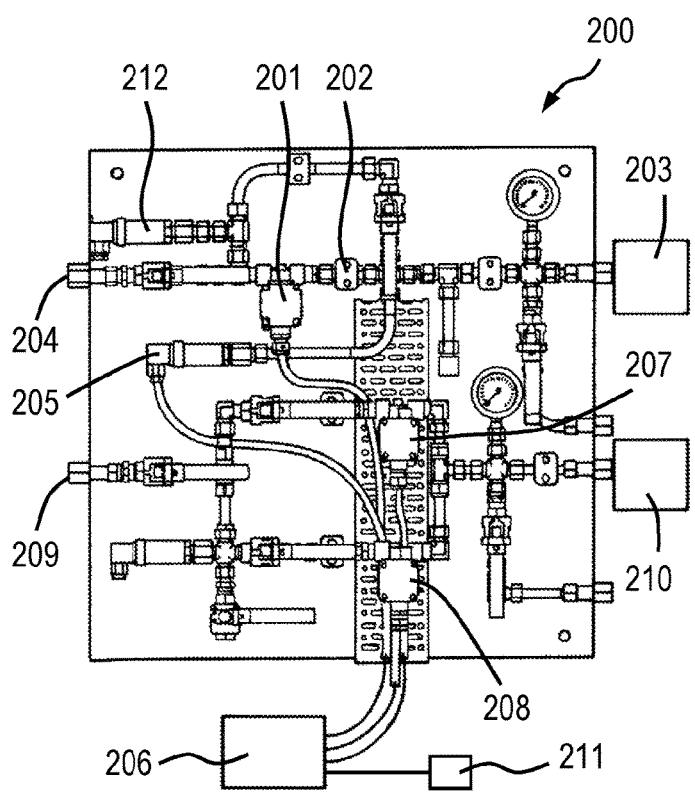

FIGS. 3A and 3B schematically show features of the system for controlling packer activation according to another embodiment of the present invention. The system 300 is similar to the system 200 and will be understood from FIGS. 2A and 2B and the accompanying text.

The system 300 comprises a fail-safe close first solenoid valve 301 in a first pathway 302 disposed between an upper packer 303 and a pressurised first air supply 304. The air pressure in the first pathway is measured by a first pressure transducer 305 which is disposed in the first pathway. The measured pressure level is communicated to a control unit 306. The control unit 306 is programmable and has adjustable settings for minimum pressure threshold. During normal operations, the control unit maintains the first solenoid valve 301 in an open position. Pressurised air is supplied to the upper packer 303 energising the upper packer 303 and maintaining a seal on the slip joint (not shown).

The system 300 also comprises a second pressure transducer 312 which monitors the pressure level in a rig divert control line 305 in a rig divert control system. In the event of a high pressure blowout during drilling operations a change of pressure will be monitored by the second pressure transducer 312 which is disposed in or connected to a rig divert control line 305 in a rig divert control system. The measured pressure level is communicated to the control unit 306. The control unit 306 is programmable and has adjustable settings for desired operating pressure range. If the measured pressure level in the rig divert control line 305 falls outside the desired operating pressure range, the control unit 306 deactivates second and third 'fail-safe open' solenoid valves 307 and 308. Once deactivated the second and third solenoid valves 307 and 308 open a pathway between a pressurised hydraulic fluid supply 309 and a lower packer 310. Pressurised hydraulic fluid is supplied to the lower packer 310 by the pressurised hydraulic fluid supply 309, energising the lower packer 310. The combination of the energised upper and lower maintain a seal on the slip joint when exposed to the high pressure blowout.

The control unit 306 may maintain the upper packer in an energised state. Alternatively the control unit 306 may de-energise the upper packer in the event of a pressure drop in the air supply to the upper packer.

Optionally, the control unit 306 may activate an alarm 311 when the pressure in the rig divert control line 305 detected by the second pressure transducer 312 is outside the pressure threshold range. The alarm 311 alerts a user that the pressure rig divert pathway has fallen outside the desired operating pressure range. Optionally, the control unit 306 may have PLC screen which displays the message "Divert Activated".

An advantage of this system is that both packers may be energised at the same time during a rig divert operation. Due to the high pressure blowout in a rig divert operation it is possible that a single packer may not be able to withstand the higher than normal pressures and may not provide an adequate seal under these circumstances. However this system provides that both packers are energised ensuring that the seal is maintained.

By having both packer energised at the same time should one packer fail, the remaining packer is in place and prevents large volumes of drill fluids and contaminated oil from leaking into the environment.

FIGS. 4A and 4B schematically show features of the system for controlling packer activation according to another embodiment of the present invention. The system 400 comprises the same features as system 300 and will be understood from FIGS. 3A and 3B and the accompanying text.

As with the system 300 during rig divert operation, a control unit 401 maintains the activation of a first solenoid valve 402 in an open position. Pressurised air is supplied to the upper packer 403 energising the upper packer 403.

In the event of a high pressure blowout during drilling operations a change of pressure will be monitored by the second pressure transducer 411 which is disposed in or connected to a rig divert control line 410 in a rig divert control system. The measured pressure level is communicated to the control unit 401. The control unit 401 is programmable and has adjustable settings for desired operating pressure range. If the measured pressure level in the rig divert control line 410 falls outside the desired operating pressure range, the control unit 401 deactivates the second and third solenoids valves 404 and 405 opening a pathway between a pressurised hydraulic fluid supply 406 and a lower packer 407. Pressurised hydraulic fluid is supplied to the lower packer 407 by the pressurised hydraulic fluid supply 406, energising the lower packer 407. The first and second packers are now energised.

In the event of a failure of the upper packer 403 while the system is in a rig divert operation a pressure drop may be detected by a pressure transducer 408 disposed in the pathway between the upper packer 403 and a pressurised first air supply 409. The control unit 401 may be set to close the first solenoid valve 402 which closes the pathway between the air supply 409 and the upper packer 403.

By providing individual control of the packer activation a failed upper packer can be de-energised and the pressurised supply air that would be lost by the leaking failed packer can be preserved.

The above describes the upper packer functioning as the primary packer which is energised during normal operations and the lower packer functioning as a secondary packer which may be activated as an alternative to the primary packer or both packers activated at the same time. However this is merely an example and it will be appreciated that the lower packer may function as the primary packer and the upper packer may function as a secondary packer which may be activated as an alternative to the primary packer or both packer activated at the same time.

Figures 5A, 5B:
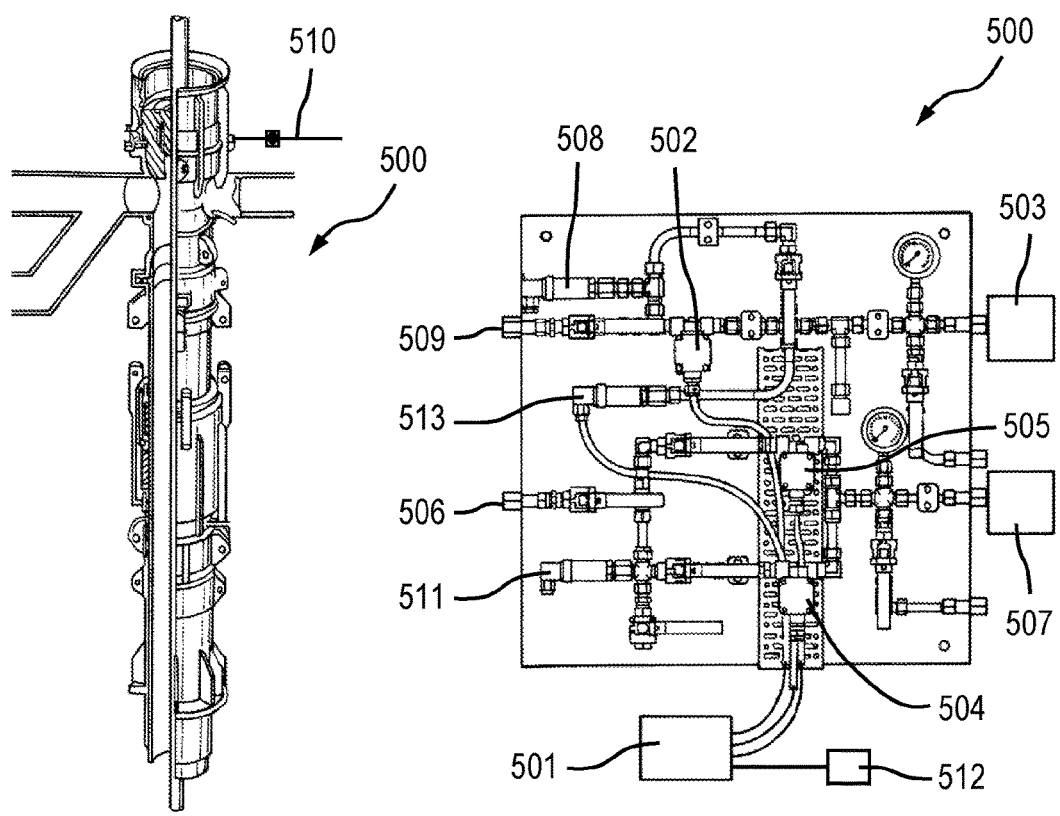
FIGS. 5A and B is a schematic instrumentation diagram of a system according to a further embodiment of the invention.

FIG. 5 schematically show features of the system for controlling packer activation according to a further embodiment of the present invention. The system 500 comprises the similar features as system 300 and will be understood from FIGS. 3A and 3B and the accompanying text.

As with the system 300 during rig divert operation, a control unit 501 maintains the activation of a first solenoid valve 502 in an open position. Pressurised air is supplied to the upper packer 503 energising the upper packer 503.

In the event of a high pressure blowout during drilling operations a change of pressure will be monitored by the second pressure transducer 511 which is disposed in or connected to a rig divert control line 510 in a rig divert control system. The measured pressure level is communicated to the control unit 501. The control unit 501 is programmable and has adjustable settings for desired operating pressure range. If the measured pressure level in the rig divert control line 510 is outside the desired operating pressure range, the control unit 501 opens the second and third solenoids valves 504 and 505 opening a pathway between a second pressurised air supply 506 and a lower packer 507. Pressurised air is supplied to the lower packer 507 by the second pressurised air supply 506, energising the lower packer 507. The first and second packers are now energised.

While the pressurised fluid supply is described as being a pressurised air supply, this is merely an example and any other fluid supply such as a hydraulic supply may be used.

In the event of a failure of the air supply to the upper packer 503 while the system is in rig divert operation a pressure drop in the air supply 509 to the upper packer 503 may be detected by a second pressure transducer 508 disposed in the pathway between the pressurised first air supply 509 and the first solenoid valve 502. A pressure drop may also be detected by the pressure transducer 513 disposed between the first solenoid valve 502 and the upper packer 503. The measured pressure level(s) is communicated to a control unit 501. The control unit 501 is programmable and has adjustable settings for minimum pressure threshold level. If the pressure level measured by the pressure transducers 508 and or 513 falls below the preset minimum pressure threshold level the control unit 501 may close the first solenoid valve 502 which closes the pathway between the first air supply 509 and the upper packer 503.

The control unit 501 may also maintain the second and third solenoid valves 504 and 505 in a open state, thereby continuing to energise the lower packer 507.

Optionally, once the first solenoid valve 502 is closed the pressure level measured by the pressure transducer 513 may be used to diagnose whether the pressure drop was a result of a fault with the air supply 509 or a failure of the upper packer 503. If when the solenoid valve 502 is closed the pressure level measured by the pressure transducer 513 rises above the preset minimum pressure threshold the fault is diagnosed as a failed upper packer 203. However, if when the solenoid valve 502 is closed the pressure level measured by the pressure transducer 513 remains below the preset minimum pressure threshold the fault is diagnosed as fault in the air supply 509.

In other embodiments of the invention, the control unit may deactivate an alarm 512 and/or the lower packer when it is determined that the pressure in a rig divert control line 510 in a rig divert control system is operating within its desired pressure range.

The described embodiments relate to a system provided with pressurised air supplies to energise the packers. However, the present invention may also be applied to other methods of packer activation such as pressurised gas or liquids.

The invention provides a system and method for controlling packer activation in a riser slip joint. The system comprises a first electronically actuated valve disposed between a first packer and a fluid pressure source for the actuation of the first packer. A second electronically actuated valve is disposed between a second packer and a fluid pressure source for the actuation of the second packer. A control unit is operable to actuate the first and/or second electronically actuated valve in response to at least one input signal to control the activation of the first and second packers, and is configured to control the actuation of the first and second electronically actuated valves independently.

The present invention in its various aspects provides an improved system and method of controlling the activation of packers in a riser slip joint system. It prevents the leakage of drilling fluids and oil contaminated mud thereby avoiding potential negative impact on the company from an attentive global community focussed on environmental protection. It also maintains the hydrostatic pressure in the wellbore. The improved system and method provides control of the packer seal during rig divert operations where the seal may be exposed to high pressure blowouts.

The present invention also provides independent control over the activation of each packer which allows each packer to be activated irrespective of the status of the other packer. This allows the activation of the first packer only, the second packer only or both packers at the same time. This allows maintenance operations and repairs to be performed on one of the packers whilst the other packer maintains the seal. The activation of both packers at the same time also ensures the seal integrity is maintained during rig divert operations.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention herein intended.

The invention claimed is:

1. A system for monitoring and controlling packer activation in a riser slip joint comprising:
   a first electronically actuated valve disposed between a first packer of the riser slip joint and a first packer fluid pressure source for the actuation of the first packer;

a second electronically actuated valve disposed between a second packer of the riser slip joint and a second packer fluid pressure source for the actuation of the second packer;

at least one pressure sensor for monitoring at least one of a pressure between the first packer and the first packer fluid pressure source and a pressure between the second packer and the second packer fluid pressure source; and a control unit operable to actuate the first and second electronically actuated valves in response to at least one input signal comprising a pressure signal from the at least one pressure sensor to control the activation of the first and second packers;

wherein the control unit is configured to control the actuation of the first and second electronically actuated valves independently to enable at least one of the first and second packers to be energized irrespective of the status of the other one of the first and second packers.

2. The system according to claim 1 wherein at least one of the first electronically actuated valve and the second electronically actuated valve is a solenoid valve.

3. The system according to claim 1 wherein the control unit is configured to compare the pressure signal with at least one historical measured pressure level and generate a control signal when the pressure signal differs from the at least one historical measured pressure level by an amount equal to or greater than a preset value.

4. The system according to claim 1 wherein the control unit is configured to close the first electronically actuated valve to de-energise the first packer.

5. The system according to claim 1 wherein the control unit is configured to open the second electronically actuated valve to energise the second packer.

6. The system according to claim 1 wherein the control unit is configured to activate the first packer and the second packer when in a rig divert mode.

7. The system according to claim 1 wherein the system comprises a pressure sensor in a rig divert control line, and the control unit is configured to activate the first packer and the second packer when a change in pressure is detected in the rig divert control line.

8. The system according to claim 1 wherein the first packer fluid pressure source and the second packer fluid pressure source comprise a gas pressure source and a hydraulic pressure source.

9. The system according to claim 1 wherein the at least one pressure sensor comprises a first pressure source sensor for monitoring the pressure of the first packer fluid pressure source and a second pressure source sensor for monitoring the pressure of the second packer fluid pressure source.

10. The system according to claim 1 comprising a manual control system operable to activate at least one of the first and second packers.

11. The system according to claim 1 wherein the first packer fluid pressure source and the second packer fluid pressure source are the same fluid pressure source.

12. The system according to claim 1 wherein the first packer fluid pressure source and the second packer fluid pressure source are different fluid pressure sources.

13. A riser or slip joint apparatus comprising the system for controlling packer activation according to claim 1.

14. A hydrocarbon production or exploration installation comprising the system for controlling packer activation according to claim 1.

15. A method of monitoring and controlling packer activation in a riser slip joint comprising:

providing a packer activation apparatus comprising a first electronically actuated valve disposed between a first packer of the riser slip joint and a first packer fluid pressure source for the actuation of the first packer and a second electronically actuated valve disposed between a second packer of the riser slip joint and a second packer fluid pressure source for the actuation of the second packer;

monitoring, using at least one pressure sensor, at least one of a pressure between the first packer and the first packer fluid pressure source and a pressure between the second packer and the second packer fluid pressure source;

receiving at least one input signal in a control unit, the input signal comprising a pressure signal from the at least one pressure sensor;

generating a control signal from the control unit in response to the at least one input signal from the at least one pressure sensor to control the actuation of the first and second electronically actuated valves;

controlling, using the control unit, the actuation of first and second electronically actuated valves independently to energize at least one of the first and second packers irrespective of the status of the other one of the first and second packers.

16. The method according to claim 15 comprising comparing the pressure signal with at least one historical measured pressure level and generating the control signal when the measured pressure signal differs from the at least one historical measured pressure level by an amount equal to or greater than a preset value.

17. The method according to claim 15 comprising activating at least one of the first and second packers when a pressure drop is detected between at least one of the first and second packers and the first and second packer fluid pressure sources.

18. The method according to claim 15 wherein the at least one monitored pressure comprises an upstream pressure measured at a first location on an upstream side of a restriction in a pathway to a respective packer, and the method comprises comparing the upstream pressure with a downstream pressure value at a second location on a downstream side of the restriction.

19. The method according to claim 18 comprising diagnosing a packer fault condition or a fluid pressure source fault from the comparison of the upstream pressure at the first location and the downstream pressure at the second location.

20. The method according to claim 19 wherein the first and second locations are on opposing sides of one of the first or second electronically actuated valves.

21. The method according to claim 15 comprising measuring a pressure of a fluid in a rig divert control system and activating the first packer and the second packer when a change in pressure in a rig divert mode line is detected.

22. The method according to claim 15 comprising manually activating at least one of the first or second packers.

23. The method according to claim 15 wherein the first packer fluid pressure source and the second packer fluid pressure source are the same fluid pressure source.

24. The method according to claim 15 wherein the first packer fluid pressure source and the second packer fluid pressure source are different fluid pressure sources.

* * * * *